United States Patent Office.

CARL MEINERTH, OF NEWBURYPORT, MASSACHUSETTS.

Letters Patent No. 66,726, dated July 16, 1867.

MODE OF PRINTING PHOTOGRAPHS.

*The Schedule referred to in these Letters Patent and making part of the same.*

Be it known that I, CARL MEINERTH, of Newburyport, Essex county, in the State of Massachusetts, have invented a new and improved Method of Printing Photographs; and I do herewith declare that the following is a full and exact description of this my method.

My invention consists in placing between the negative film and the paper or any other substance to print the picture upon, a layer of mica, or glass, or other transparent medium, or a mat, or the glass of the negative itself, whereby, during printing, the rays of light are so dispersed as to prevent a too sharp image, and produce one of uniform softness and roundness, having the effect of a mezzo-tinto, or of marble, alabaster, porcelain, &c.

Thus I claim the interposition of any transparent medium, or a mat between the negative film and the printing surface, for the purpose of producing the effect as shown in the enclosed specimens.

<div align="right">CARL MEINERTH.</div>

Witnesses:
  CHAS. M. HODGE,
  JOHN M. BROWN.